(12) United States Patent
Magen (10) Patent No.: US 8,500,107 B2
(45) Date of Patent: Aug. 6, 2013

(54) AERATION DEVICE FOR THE INTRODUCTION OF GAS BUBBLES INTO A LIQUID MEDIUM

(75) Inventor: Hanoch Magen, Kiryat Haim (IL)

(73) Assignee: Mapal Green Energy Ltd., Nesher (IL)

( * ) Notice: Subject to any disclaimer, the term of this patent is extended or adjusted under 35 U.S.C. 154(b) by 484 days.

(21) Appl. No.: 12/739,095

(22) PCT Filed: Oct. 22, 2008

(86) PCT No.: PCT/IL2008/001378
§ 371 (c)(1),
(2), (4) Date: Apr. 21, 2010

(87) PCT Pub. No.: WO2009/053975
PCT Pub. Date: Apr. 30, 2009

(65) Prior Publication Data
US 2011/0121472 A1    May 26, 2011

(30) Foreign Application Priority Data
Oct. 22, 2007 (IL) .......................................... 186838

(51) Int. Cl.
*B01F 3/04* (2006.01)
(52) U.S. Cl.
USPC ....................... 261/120; 261/122.1; 210/242.2
(58) Field of Classification Search
USPC ..... 261/120, 122.1, 124, DIG. 70; 210/242.2
See application file for complete search history.

(56) References Cited

U.S. PATENT DOCUMENTS

| 3,846,517 | A | * | 11/1974 | Ross .................................. 261/91 |
| 3,911,064 | A |   | 10/1975 | McWhirter et al. |
| 4,086,306 | A | * | 4/1978 | Yoshinaga ....................... 261/93 |
| 4,229,302 | A | * | 10/1980 | Molvar ........................... 210/220 |
| 4,439,316 | A | * | 3/1984 | Kozima et al. ................. 210/150 |
| 4,488,508 | A |   | 12/1984 | Heideman |

(Continued)

FOREIGN PATENT DOCUMENTS

| DE | 42 06 147 A1 | 9/1993 |
| EP | 0 163 821 A1 | 12/1985 |

(Continued)

OTHER PUBLICATIONS

International Search Report for International Application No. PCT/IL2008/001378, mailed on Feb. 17, 2009, 3 pages.

(Continued)

*Primary Examiner* — Charles Bushey
(74) *Attorney, Agent, or Firm* — Vorys, Sater, Seymour and Pease LLP; Susanne M. Hopkins; William L. Klima (57) ABSTRACT

An aeration device adapted for the introduction of gas into a liquid medium is provided, including an elongated primary distribution member with a proximal end adapted to be connected to a gas source and a distal end adapted to be immersed into the medium. Additionally, at least one aeration member is connected to the primary distribution member at a location on the distribution member spaced from the proximal end thereof and being in fluid communication with the distribution member, adapted for bringing the gas into a state entrappable within the liquid medium. Also, a flotation member is provided, mounted onto the primary distribution member and adapted to assume various positions along the distribution member according to the level of the liquid medium. An aeration system is also provided, the system including an array of aeration devices as described above.

20 Claims, 5 Drawing Sheets

U.S. PATENT DOCUMENTS

| | | | | |
|---|---|---|---|---|
| 5,085,809 | A | * | 2/1992 | Stirling ............................ 261/77 |
| 5,354,457 | A | * | 10/1994 | Becchi ..................... 210/170.02 |
| 5,595,691 | A | * | 1/1997 | Hsu ............................... 261/120 |
| 5,681,509 | A | * | 10/1997 | Bailey ............................. 261/87 |
| 5,851,448 | A | * | 12/1998 | Tyer ........................... 261/122.1 |
| 6,390,456 | B1 | * | 5/2002 | Lee et al. ...................... 261/120 |
| 6,808,165 | B1 | | 10/2004 | Sperber, Jr. et al. |
| 7,441,754 | B2 | * | 10/2008 | Trentadue et al. .............. 261/87 |
| 7,520,493 | B1 | * | 4/2009 | Haldane ........................ 261/120 |
| 2002/0113013 | A1 | | 8/2002 | Long et al. |
| 2010/0181263 | A1 | | 7/2010 | Buch et al. |

FOREIGN PATENT DOCUMENTS

| | | | |
|---|---|---|---|
| EP | 1 319 434 | A1 | 6/2003 |
| GB | 1 268 426 | | 3/1972 |
| GB | 2 431 598 | A | 5/2007 |
| JP | 2-251213 | * | 10/1990 |
| JP | 7-136672 | A | 5/1995 |
| JP | 2002-320995 | A | 11/2002 |
| WO | 99/38813 | A1 | 8/1999 |
| WO | 2008/009484 | A2 | 1/2008 |

OTHER PUBLICATIONS

Office Action issued by the Russian Federation Patent Office for corresponding application No. 2010121914/04 (031124), dated Jul. 2, 2012, 5 pages, along with English translation (attached separately), 3 pages.

* cited by examiner

AERATION DEVICE FOR THE INTRODUCTION OF GAS BUBBLES INTO A LIQUID MEDIUM

This is a National Phase Application filed under 35 U.S.C. 371 as a national stage of PCT/IL2008/001378, filed on Oct. 22, 2008, claiming the benefit of Israel Patent Application 186838, filed on Oct. 22, 2007, the content of each of which is hereby incorporated by reference in its entirety.

FIELD OF THE INVENTION

This invention relates to aeration devices, particularly to devices adapted to be inserted into a liquid medium for the introduction therein of a gas.

BACKGROUND OF THE INVENTION

Known in the art are devices adapted to infuse air into basins of water and other fluid materials, this infusion being generally referred to as aeration. The aeration may be performed for different purposes. For example, such purposes include improving the growth of a fish population and providing better conditions for fish breeding in fish ponds, treatment of sludge, etc.

One type of aeration device is usually in the form of a piping network deployed over a basin and having pipe extensions lowered below the water level in the basin to provide air thereto.

Another type of aeration device is usually in the form of fans deployed on the surface of the water of the basin, and adapted to rotate while emitting air so as to provide the desired infusion.

SUMMARY OF THE INVENTION

According to one aspect of the present invention there is provided an aeration device adapted for the introduction of gas into a liquid medium, said device comprising:

- an elongated primary distribution member having a proximal end adapted to be connected to a gas source and a distal end adapted to be immersed into said medium;
- at least one aeration member connected to the primary distribution member at a location on said distribution member spaced from said proximal end thereof, being in fluid communication with the distribution member and being adapted for bringing said gas into a state entrappable within said liquid medium; and
- a flotation member mounted onto said primary distribution member and adapted to assume various positions along said distribution member between said proximal end and said location at which the aeration member is connected to the distribution member, according to the level of the liquid medium.

The connection between said at least one aeration member and the primary distribution member may be in the form of at least one corresponding auxiliary distribution member where one end thereof is connected to the primary distribution member at said location and the other end thereof holds said aeration member.

The primary distribution member may be formed as an essentially hollow mast having a main axis, where said mast may be made of a non-permeable material, i.e. any suitable metal such as steel, plastic, etc. The proximal end of said mast may be formed with an attachment port connectable to a gas feed line adapted to introduce said gas into said mast. The distal end of said mast may be provided with a plurality of outlet ports distributed around the main axis, oriented transversely thereto, circumferentially spaced from each other. Each outlet port is adapted for connection thereto of at least one of the auxiliary distribution members. The outlet ports may be formed integrally with the mast, or the mast may have at its distal end a distribution hub formed with said outlet ports.

The auxiliary distribution members may be formed as rods which are also essentially hollow and have an inlet end and an outlet end. The rod may be adapted for mounting onto the mast by inserting the inlet end thereof into one of said outlet ports such that when mounted, the rod extends essentially perpendicular to the mast, i.e. radially with respect to the main axis thereof.

The outlet end of each auxiliary distribution member may be formed integrally with, or have mounted thereon, said aeration member. The aeration member may be adapted to produce bubbles from said gas, for the aeration of said medium. Thus, the aeration member may be in the form of a bubble generator such as a diffuser, adapted to transform the gas introduced thereto into a plurality of bubbles.

The diffuser may be so designed as to allow control over the average bubble size. The bubble size is defined by the average diameter of the bubbles and may be, for example, coarse, e.g. about 5-7 mm, or fine, e.g. about 1 mm. Coarse bubbles may be used for aeration of a liquid in a slurry form whereas fine bubbles may be used for aeration of regular liquids.

In addition, different diffusers may be used providing the aeration device with a wide range of aerating capacities. Furthermore, Variable Frequency Drive (VFD) may be used allowing adjustment of the capacity of air introduced into the water.

The floatation member may be made of a material adapted to float on the liquid medium, i.e. having a lower specific weight than said liquid. Alternatively, the floatation member may be formed as an essentially hollow body with air or any other gas contained therein and adapted to facilitate floatation of the entire device. According to a specific embodiment, the hollow body may be in the form of a disc, the diameter of which corresponds to the length of the mast for optimal floatation stability thereof.

The device may further comprise an anchoring assembly attached to the proximal end of said primary distribution member and adapted for suspending the device above the liquid medium level, by connection of the assembly to an anchoring line extending across the medium. Alternatively, the device may be suspended from a crane-like assembly. Suspension may be used in a variety of situations, e.g. prior to lowering of the device into the water, during cleaning or draining of the pool, for cleaning of the device, etc.

The anchoring assembly and anchoring line may also be used to position the device at a desired location across the medium. Thus, for example, the device may be displaced along the anchoring line until it reaches a desired position above the liquid medium, and may then be detached from the anchoring line and dropped into the liquid.

The device may further comprise support elements extending from the distal end thereof and adapted to prevent impact of the primary distribution member and/or auxiliary distribution members with the bottom surface of a basin in which the liquid medium is disposed. The support elements may be in the faun of legs made of any appropriate material, e.g. steel, and may be equipped with cushion fittings adapted to prevent excessive impact on the device when coming in contact with the basin floor. Soft impact of the aeration device with the basin floor may also prevent damage to the basin floor.

The gas feed line may be made of a light weight material which may be adapted to float on the surface of the liquid medium. For example, it may be made of High Density Polyethylene (HDPE). The gas feed line is adapted to be connected to the device throughout a working process thereof, in order to provide a constant supply of gas, for example oxygen, thereto. In operation, the gas source begins pumping gas through the gas feed line into the primary distribution member, wherefrom it is supplied via auxiliary distribution members to the aeration members, which then transform the gas into bubbles of desired size and emit said bubbles into the liquid medium.

In a normal position, when the level of liquid in the basin is relatively high, the floatation member is positioned at the top of the primary distribution member, i.e. adjacent its proximal end, and the device is suspended therefrom into the liquid medium. In this position, said support elements are disposed above the bottom surface of the basin. When the level of the liquid medium drops, the entire device is displaced downwards as well, until the support elements encounter the bottom surface of the basin. Once the support elements are positioned on the bottom surface of the basin, further lowering of the liquid level will cause the floatation member to be displaced downwards along the primary distribution member. This allows the aeration device to maintain its desired orientation with the aeration members being in an essentially horizontal position.

This is opposed to common aeration devices known in the art in which the floatation member is fixed, where when the liquid level drops, the floating member may appear to be held above this level. Thus, the floatation member may turn into a counterweight which, due to its high wind resistance, may act as a 'sail' and tilt the entire aeration device and even tip it over.

It would also be appreciated that the aeration device according to the present invention may be particularly useful in cases where the basin floor is uneven, e.g. resulting from construction quality. The aeration device may also be useful in cases where the level of the basin floor tends to change due to collection of sludge or solids.

According to another aspect of the present invention, there is provided a system comprising an array of aeration devices as described above, in each of which the location of their floating members along the primary distribution member is individually adjustable.

It should be noted here that according to a specific design variation, the formation of the aeration members and/or their or the auxiliary distribution members' articulation to the primary distribution member may be such as to cause the bubbles to perform a rotary motion about the main axis of the primary distribution member, thereby to facilitate aeration and penetration of gas bubbles into the liquid, and better mixing capacity of the basin.

Another advantage of the aeration device according to the present invention lies in the fact that it comprises no moving parts within the water during operation thereof. This provides infusion of a considerable amount of oxygen into the medium of the basin, while maintaining an essentially low power consumption of the aeration device.

BRIEF DESCRIPTION OF THE DRAWINGS

In order to understand the invention and to see how it may be carried out in practice, embodiments will now be described, by way of non-limiting examples only, with reference to the accompanying drawings, in which.

DETAILED DESCRIPTION OF EMBODIMENTS

Figure 1:
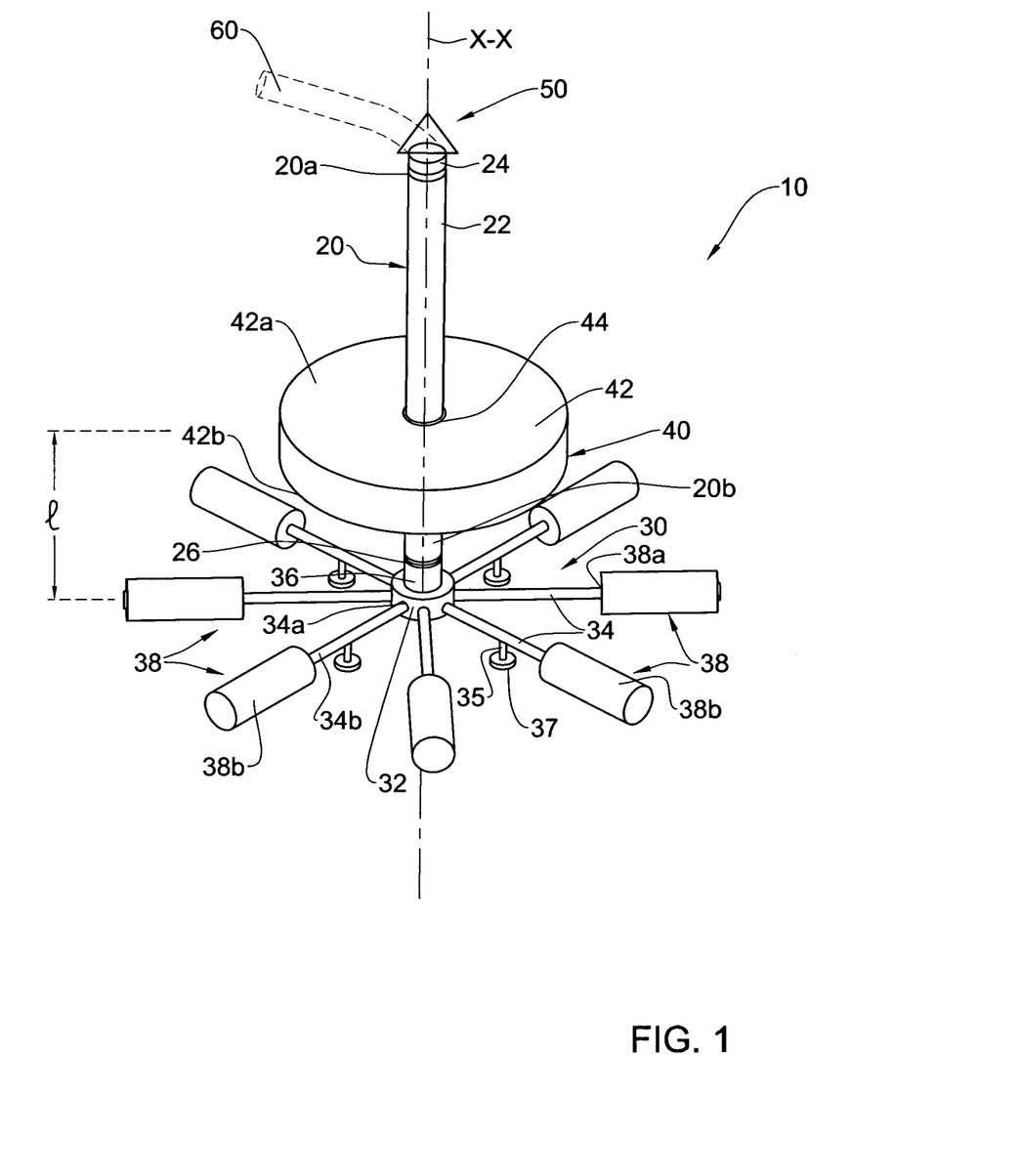
FIG. 1 is a schematic isometric view of one example of an aeration device according to the present invention.
Figure 2A:
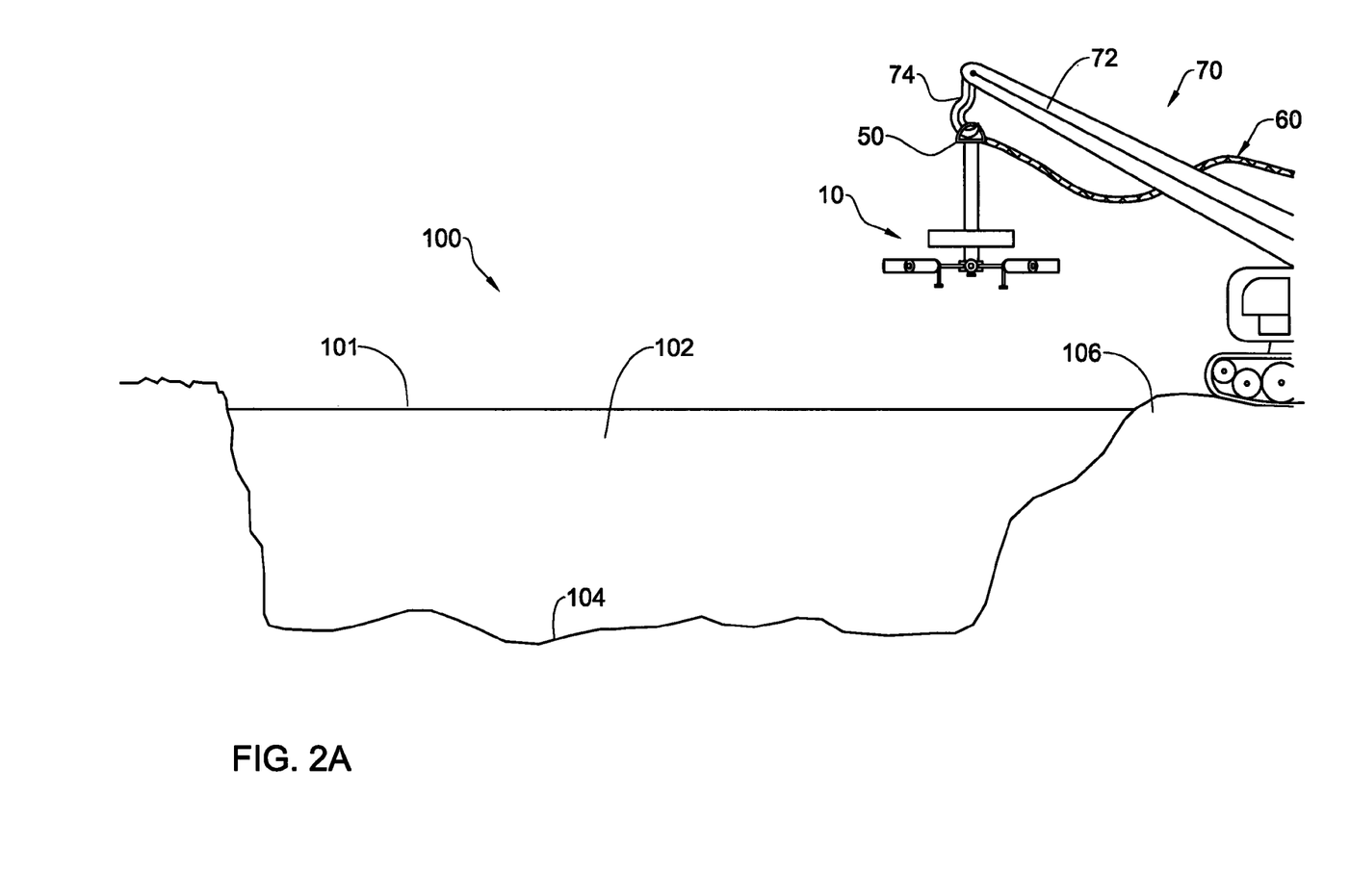
FIG. 2A is a schematic view of an anchor holding the device shown in FIG. 1 suspended therefrom, in accordance with one embodiment of the present invention.
Figure 2B:
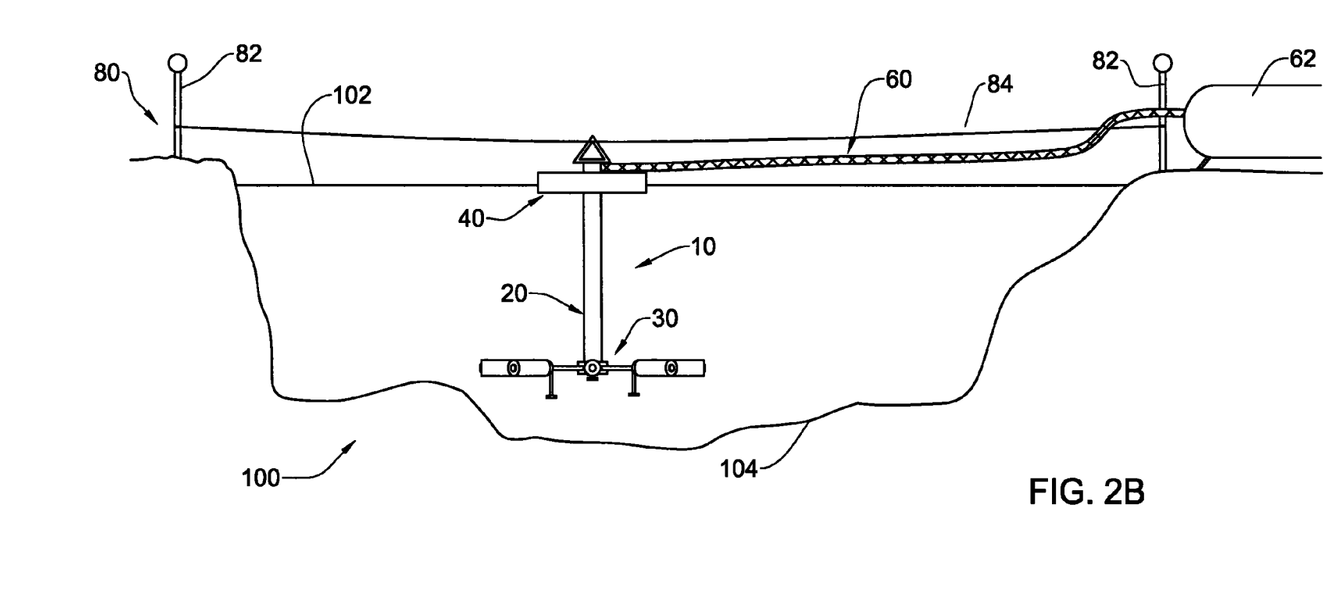
FIG. 2B is a schematic view of an alternative anchoring arrangement according to another embodiment of the present invention.
Figure 3A:
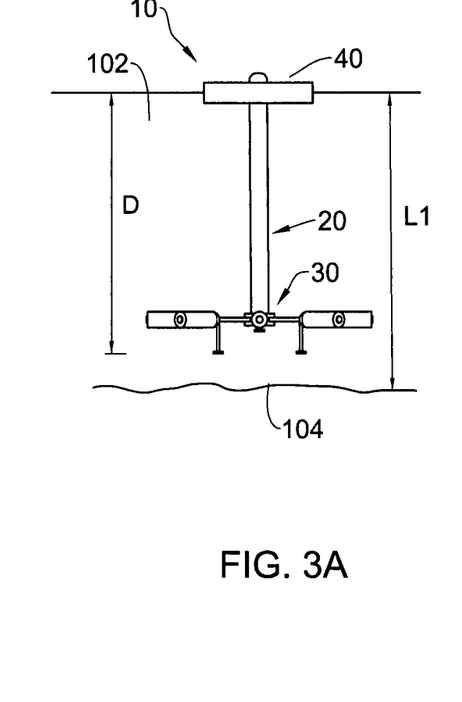
FIG. 3A is a schematic view of the device shown in FIG. 1 in its position within a liquid medium, whose level exceeds the entire length of the device.
Figure 3B:
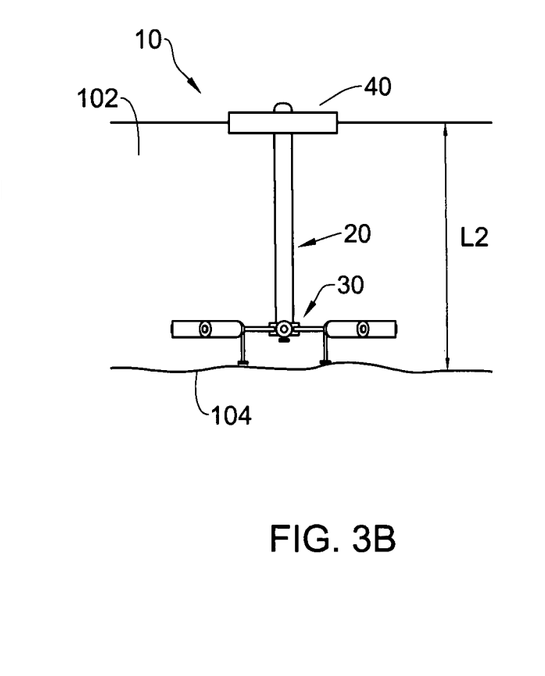
FIG. 3B is a schematic view of the device shown in FIG. 1 in its position within a liquid medium, whose level is equal to the length of the device.
Figure 3C:
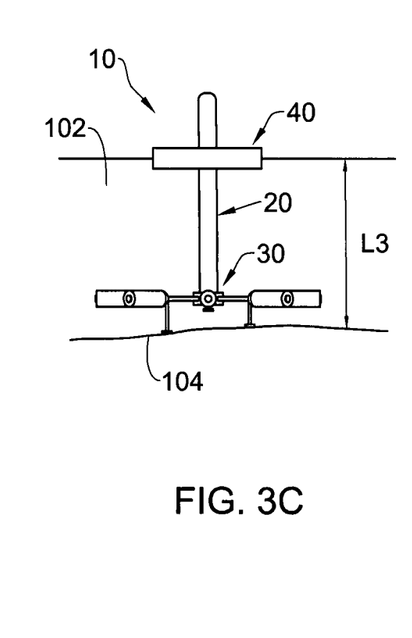
FIG. 3C is a schematic view of the device shown in FIG. 1 in its position within a liquid medium, whose level is lower than the length of the device.
Figure 4:
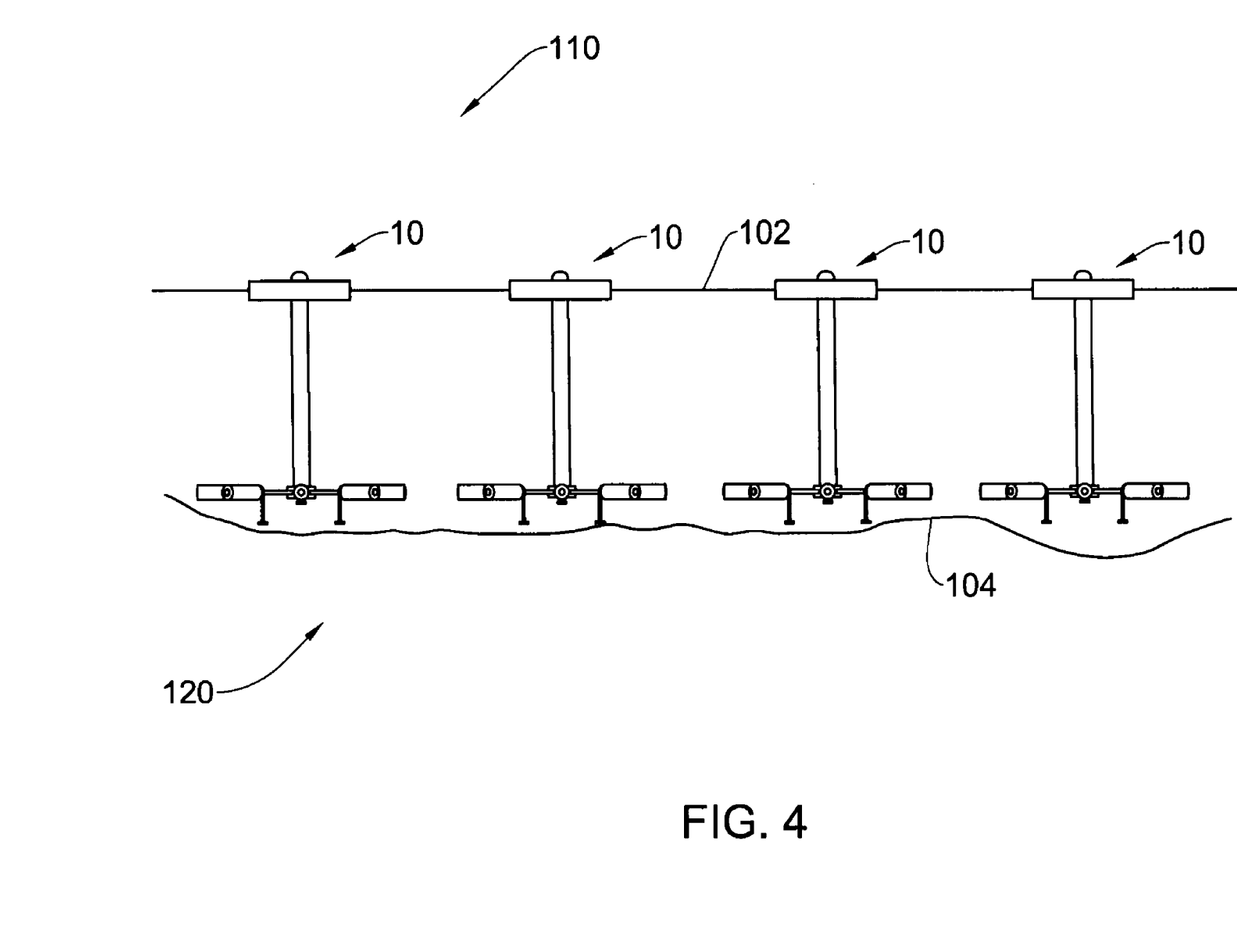
FIG. 4 is a schematic view of an array of aeration devices shown in FIG. 1 in a basin having an undulated bottom surface.

FIG. 1 shows an aeration device generally designated at 10, adapted for introducing oxygen into a liquid medium (shown in FIGS. 2-4).

The aeration device 10 comprises an elongated primary distribution member 20 having a proximal end 20a and a distal end 20b, a distribution assembly 30 attached to the distal end 20b of the primary distribution member 20, a floatation member 40 mounted on the primary distributor 20, and an anchoring member 50 attached to the proximal end 20a of the primary distribution member 20.

The primary distribution member 20 is an essentially hollow cylindrical mast of a diameter of about 2-3", and having an axis X-X and formed at its proximal end 20a with an attachment port 24 adapted for the attachment thereto of a oxygen feed line 60, shown in FIGS. 2 to 4, and a distribution port 26 which is threaded in order to mount thereon the distribution assembly 30. The mast 22 may be made of a variety of impermeable materials, for example steel, plastic etc.

The distribution assembly 30 comprises a plurality of auxiliary distribution members 34 each having a proximal end 34a and a distal end 34b, and a central distribution hub 32 to which the members 34 are attached at their proximal ends 34a. The auxiliary distribution members 34 are in the form of radially extending hollow arms which are in fluid communication with the mast 20 via the hub 32. The auxiliary distribution members 34 extend radially with respect to the axis X-X and are equally angularly spaced from each other.

Each of the auxiliary distribution members 34 is fitted at its distal end 34b with an aeration member 38 which has an inlet port 38a in fluid communication with the interior of the distribution member 34. In this case, each aeration member 38 is in the form of a tubular diffuser adapted for transforming oxygen entering its inlet port 38a into a plurality of bubbles of a predetermined size and discharging these bubbles through a membrane jacket of the diffuser. An example of such a diffuser may be the Airflex™ Tube Diffuser 2.

For example, fine bubbles may be about 1 mm, in which case the diffuser may have a diameter of about 6.5 cm, and coarse bubbles may be 5-7 mm in which case the diffuser may have a diameter of about 9.4 cm. Coarse bubbles may be used for aeration of a liquid in a slurry form whereas fine bubbles may be used for aeration of regular liquids.

The device 10 further comprises a set of legs 35 projecting axially and outwardly from the auxiliary distribution members 34 and adapted to prevent the diffusers 38 from impacting a solid surface (not shown in FIG. 1) above which the device is to be used (e.g. the bottom of a basin in which the liquid medium to be aerated is disposed). Each leg 35 is fitted with a cushioning pad 37 adapted to avoid damage to the basin liner and the device 10, in the case that such an impact occurs.

The floatation member 40 is formed with a central bore 44 adapted to let the mast 22 freely pass therethrough. The floatation member 40 is in the form of a cylinder of a diameter of about 1.3 m filled with air, and having sufficient buoyancy so as to keep the entire device floating on the surface of the liquid to be aerated, when the floatation member is in its uppermost position on the mast 20. The floatation member 40 also employs polymeric agent to block water entrance when damaged, as known per se.

The anchoring member 50 is attached to the proximal end 20a of the mast 20 and is adapted to facilitate suspension of the device 10 by any suitable means. The anchoring member 50 has a dimension in the direction perpendicular to the axis X-X which is greater than the maximal dimension of the bore 44, allowing the anchoring member 50 to serve as a stopper for the floatation member 40, preventing the latter from detachment from the mast 22.

In assembly, the floatation member 40 is mounted on the mast 22 in a free manner to be able to be displaced along the mast 22. Thereafter, the distribution hub 32 with auxiliary distribution members 34 mounted thereon is mounted onto the distal end 20b of the mast 22 and the aeration members 38 are attached to each of the auxiliary distribution members 34 such that the aeration members 38 extend radially outwards relative to the main axis of the mast 22. Next, the aeration device 10 is attached to an oxygen feed line 60 and the anchoring member 50 is attached to the proximal end 20a of the mast 22.

Turning to FIG. 2A, the aeration device 10 is shown before operation, suspended over a basin 100 having an uneven basin bed 104 and containing water 102 having a surface 101. A crane 70 is positioned on the basin bank 106 with its crane arm 72 reaching out across the basin 100. The crane arm 72 is equipped with a hook 74 to which the anchoring member 50 of the device 10 is attached. An oxygen feed line 60 is attached to the attachment port 24 of the mast 22 (see FIG. 1) to connect the mast to an oxygen source 62 (not shown in FIG. 2), positioned on the bank 106. The crane arm 72 is adapted to bring the device 10 to a desired location over the basin 100. Once in position, the device 10 is detached from the hook 74 and plummets into the water 102.

Turning to FIG. 3A, the device 10 is shown floating in the water 102. The floatation member 40 causes the device 10 to be suspended above the bottom surface 104, leaving the distribution assembly 30 completely submerged in the water 102. The depth L1 of the water is greater than the length D of the device 10 such that the legs 37 do not touch the bottom surface 104 of the basin 100.

Turning to FIG. 3B, when the water level drops to L2=D, the device 10 rests on the legs 37, the floatation member 40 being still positioned at the top of the mast 22, enabling vertical orientation of the mast.

Turning to FIG. 3C, when the water level drops to L3<D, the legs 37 continue abutting the bottom surface 104, whilst the floatation member 40 is displaced downwardly along the mast 22. Consequently, the mast 22 continues to be maintained in its vertical orientation due to the floatation member 40, which would not be the case if the floatation member were fixed on the mast, in which case the floatation member would have been suspended above the water level, causing the aeration device to tip over and malfunction.

It should be noted that according to the above described example, once the device 10 is positioned within the basin 100, it is attached only to the oxygen feed line 60, eliminating the need for a large, bulky and expensive infrastructural construction over the basin 100 to support the device 10 in a suspended state. Since the oxygen feed line 60 is made of a light material, as mentioned above, it may float on the water 102, thus avoiding the need to suspend it above the basin 100.

In operation, the device 10 receives oxygen from the oxygen source 62 through the oxygen feed line 60 attached to the mast 20, through which oxygen is transferred, via the arms 34, to the aeration members 38, from which the oxygen is emitted into the water 102 in the form of oxygen bubbles 12. During operation of the aeration device 10, the emission of the bubbles from auxiliary distribution assembly 30 causes turbulence of the water around the mast 22, facilitating better infusion of the air within the water 102 of the basin 100.

With reference to FIG. 2B, an example is shown in which the crane 70 is substituted with a cable assembly 80 comprising anchoring masts 82 positioned on the basin bank 106, and a guiding cable 84 extending therebetween at a height smaller than the distance between the proximal end 20a and the floating member's upper surface 42a.

According to this example, the device 10 is anchored to the cable 84 by its anchoring member 50 and is displaced along the cable 84, for example in a ferry-like manner, until it reaches a desired location across the basin 100. Once the desired position has been reached, the device 10 is released from the cable 84 and remains there and begins its operation. This construction also proves to be easy to set up and cost efficient, requiring only the anchoring masts 82 and the guiding cable 84.

Referring to FIG. 4, an aeration system 110 is shown comprising an array of the devices 10 as described above, positioned at spaced apart locations in a basin 120 having such a topography of its bottom surface 140 that water level L at these locations is different. As shown, in view of the different water level L, all the devices have different positions of their floatation members 40 along the masts 20.

Those skilled in the art to which this invention pertains will readily appreciate that numerous changes, variations, and modifications can be made without departing from the scope of the invention, mutatis mutandis.

The invention claimed is:

1. An aeration device configured for the introduction of gas into a liquid medium, the device comprising:
   an elongated primary distribution member having a proximal end configured to be connected to a gas source and a distal end configured to be immersed into the medium;
   at least one aeration member connected to the primary distribution member at a location on the distribution member spaced from the proximal end thereof, being in fluid communication with the distribution member and being configured for bringing the gas into a state entrappable within the liquid medium; and
   a floatation member mounted onto the primary distribution member in a free manner allowing it to, assume various positions along the distribution member between the proximal end and the location at which the aeration member is connected to the distribution member, by virtue of the level of the liquid medium.

2. The aeration device according to claim 1, wherein the primary distribution member is formed as an essentially hollow mast having a main axis, the mast being made of a non-permeable material.

3. The aeration device according to claim 2, wherein the proximal end of the mast is formed with an attachment port connectable to a feed line which is a gas feed line configured to introduce the gas into the mast.

4. The aeration device according to claim 2, wherein the distal end of the mast is provided with a plurality of outlet ports located around the main axis, oriented transversely thereto and circumferentially spaced from each other, the ports being configured for connection thereto of at least one of the aeration members.

5. The aeration device according to claim 4, wherein the mast has at its distal end a distribution hub formed with the outlet ports.

6. The aeration device according to claim 1, wherein the aeration device further comprises at least one auxiliary distribution member configured to connect between the primary distribution member and the aeration member, the auxiliary distribution member being formed as an essentially hollow rod having an inlet end and an outlet end.

7. The aeration device according to claim 1, wherein the aeration member is a diffuser configured to transform the gas introduced thereto into a plurality of bubbles, for the aeration of the medium.

8. The aeration device according to claim 7, wherein the diffuser is configured to transform the gas introduced into the liquid medium into a plurality of bubbles in the range of between about 5-7 mm, as defined by the average diameter of the bubbles.

9. The aeration device according to claim 7, wherein the diffuser is configured to transform the gas introduced into the liquid medium into a plurality of bubbles in the range of about 1 mm, as defined by the average diameter of the bubbles.

10. The aeration device according to claim 1, wherein the floatation member is formed as an essentially hollow body with air or any other gas contained therein configured to facilitate floatation of the entire device.

11. The aeration device according to claim 1, wherein an arc of the floatation member corresponds to the length of the primary distribution member for optimal floatation stability thereof.

12. The aeration device according to claim 1, wherein the aeration device further comprises an anchoring assembly attached to the proximal end of the primary distribution member configured for suspension of the device therefrom above the liquid medium level.

13. The aeration device according to claim 12, wherein the anchoring assembly is configured to be connected to an anchoring line extending across the medium for the purpose of suspension of the device.

14. The aeration device according to claim 12, wherein the anchoring assembly is configured to be connected to a crane-like assembly for the purpose of suspension of the device.

15. The aeration device according to claim 12, wherein the aeration device is configured to first be positioned and suspended at a desired location above and across the medium by a suspender, and wherein the anchoring assembly is configured to detach from the suspender to plummet into the medium.

16. The aeration device according to claim 1, wherein the aeration device further comprises support elements extending from the distal end thereof.

17. The aeration device according to claim 16, wherein the support elements are configured to prevent impact of primary distribution member and/or auxiliary distribution members with the bottom surface of a basin in which the liquid medium is disposed.

18. The aeration member according to claim 3, wherein the gas feed line is made of a light weight material configured to float on the surface of the liquid medium.

19. The aeration device according to claim 18, wherein the gas feed line is made of High Density Polyethylene (HDPE).

20. The aeration system configured for the introduction of gas into a liquid medium, the system including an array of aeration devices according to claim 1.

* * * * *